United States Patent
Bivens (10) Patent No.: US 8,651,017 B2
(45) Date of Patent: Feb. 18, 2014

(54) FILTER ASSEMBLY FOR FRYER AND METHOD

(76) Inventor: Thomas H. Bivens, Magnolia, TX (US)

(*) Notice: Subject to any disclaimer, the term of this patent is extended or adjusted under 35 U.S.C. 154(b) by 895 days.

(21) Appl. No.: 12/258,310

(22) Filed: Oct. 24, 2008

(65) Prior Publication Data

US 2009/0107344 A1    Apr. 30, 2009

Related U.S. Application Data

(60) Provisional application No. 60/983,059, filed on Oct. 26, 2007.

(51) Int. Cl.
*A47J 37/12* (2006.01)
(52) U.S. Cl.
USPC ............................................................... 99/408
(58) Field of Classification Search
USPC ............................................................... 99/408
See application file for complete search history.

(56) References Cited

U.S. PATENT DOCUMENTS

| | | | |
|---|---|---|---|
| 2,635,527 A | 5/1950 | Overbeck et al. | |
| 2,760,641 A | 8/1951 | Mies, Jr. et al. | |
| 3,363,541 A * | 1/1968 | Anetsberger | 99/408 |
| 3,968,741 A * | 7/1976 | Hunt | 99/330 |
| 5,184,539 A * | 2/1993 | Oiwa | 99/408 |
| 5,247,876 A | 9/1993 | Wilson et al. | |
| RE34,636 E | 6/1994 | Bivens | |
| 5,404,799 A | 4/1995 | Bivens | |
| 5,449,469 A * | 9/1995 | Burklund et al. | 210/798 |
| 5,486,370 A * | 1/1996 | Bivens | 426/417 |
| 5,595,107 A | 1/1997 | Bivens | |
| 5,597,601 A | 1/1997 | Griffin | |
| 6,095,037 A * | 8/2000 | Savage et al. | 99/408 |
| 6,371,307 B1 * | 4/2002 | Eskes | 210/483 |
| 6,955,118 B1 | 10/2005 | Bivens | |
| 2007/0170109 A1 | 7/2007 | Bivens | |

* cited by examiner

*Primary Examiner* — Gene Kim
*Assistant Examiner* — Amir Klayman
(74) *Attorney, Agent, or Firm* — Keeling Patents & Trademarks, LLC; Melissa M. Martinez; Kenneth A. Keeling (57) ABSTRACT

A filter system for use in a fryer includes multiple filter apparatus in a container. The filter apparatus each comprise a filter assembly, and a manifold block. Each filter assembly has a drain bracket and drain fitting attached to the lower edge. The drain fitting is shaped to slidably fit into the manifold block. Multiple filter assemblies with associated valves are in fluid communication with a pump each valve operable to close fluid communication. Flow through a filter assembly may be shut off for removal or replacement of the filter assembly during continued operation of the fryer and continued filtration by another filter assembly.

15 Claims, 8 Drawing Sheets

FILTER ASSEMBLY FOR FRYER AND METHOD

CROSS-REFERENCE TO RELATED APPLICATIONS

This application claims the benefit of Provisional Patent Application Ser. No. 60/983,059, entitled "Liquid Filtering Apparatus," filed Oct. 26, 2007 in the United States Patent and Trademark Office by the present inventor, which is incorporated herein by reference.

STATEMENT REGARDING FEDERALLY SPONSORED RESEARCH OR DEVELOPMENT

Not Applicable.

BACKGROUND OF THE INVENTION

1. Field of the Invention

This application relates generally to the filtering of liquids in containers, and, more specifically, to an improved liquid filter apparatus.

2. Description of the Related Art

Cooking oil is extensively used in the food industry to cook comestibles. Animal fat, vegetable oil or other suitable material may be used as the cooking material. The term "cooking oil" is used herein to designate any such material.

Frying is frequently accomplished in relatively deep containers with the comestible to be cooked immersed in the cooking oil. In cases where quantities of food are regularly cooked in such a manner, the cooking oil becomes contaminated with various particles of food or other impurities. Food particles become charred from continued exposure to temperatures used in frying operations. Such charred food particles produce an odor and adversely affect the taste of foods cooked therein. Degradation of the cooking oil by suspended contaminants may also have a negative effect on the health of the consumer.

To beneficially control free fatty acids, polymers, and other undesirable components in the cooking oil, suspended particles of comestibles should be removed from the cooking oil. Wire mesh strainers have been long known and used to remove particulate matter from cooking oil. Strainers have not been effective to remove sufficient particulate matter to provide particulate-free cooking oil, and only slightly prolong the usefulness of the cooking oil.

Many conventional systems for filtering cooking oil require that the cooking operation be interrupted for the filtering procedure to be accomplished. The cooking oil is typically removed from the fryer container, and filtered and returned to the fryer, or, alternatively is replaced. Continuous filtering systems allow filtering during the frying operation.

U.S. Pat. No. 2,635,527 to Overbeck discloses a deep frying strainer to be located at the bottom of the cooking oil container to strain food particles from cooking oil as the strainer is lifted from the container. Although beneficial to remove some particulate matter, the invention disclosed does not effectively remove smaller particulate contaminants.

U.S. Pat. No. Re. 34,636, reissued on Jun. 14, 1994, to the present inventor, describes a cooking oil filter apparatus which can be used to effectively remove particulates from the cooking oil. Cooking oil is drawn through wire mesh screens by applying suction at the filter interior. As the cooking oil is drawn through the wire mesh screens, the screen serves to remove particulates from the cooking oil. The particulate-free cooking oil is then drawn into an outlet and drawn through the tank to a pump. The pump passes the cooking oil back into the tank.

U.S. Pat. No. 5,404,799, issued on Apr. 11, 1995, and U.S. Pat. No. 5,486,370, issued on Jan. 23, 1996, both to the present inventor, describe cooking oil filter apparatuses and methods which can be used to effectively remove particulates from the cooking oil.

U.S. Pat. No. 2,760,641 to Miles, et al. discloses a portable filter apparatus for use in cleaning cooking oil or other liquids. Contaminated cooking oil is first drained from the cooking reservoir into a draw-off container. The filter is then submerged in the oil in the draw-off container. The oil is then pumped by the pump motor through the filter and pump. The pump discharges the oil through a discharge tube and into the cooking reservoir.

U.S. patent application Ser. No. 11/621,226 of the present inventor discloses a portable liquid filter apparatus for filtering cooking oil in a container. The apparatus includes a mounting bracket that supports a pump and attaches to the container. A filter element is placed in the container for filtering the liquid. The pump draws the liquid through the filter element and a suction tube and discharges it back into the container for reuse. This apparatus permits the filtering of the cooking oil during the cooking operation.

U.S. Pat. No. 6,955,118 B1, issued on Oct. 18, 2005, to the present inventor describes a filter mounting apparatus that allows the filter to be removed for cleaning while the oil is still hot. The patent discloses a slip fitting mounted to the filter assembly and a receiver.

BRIEF SUMMARY OF THE INVENTION

A filtering system for a continuous filtering fryer includes a plurality of filter apparatuses. Each filter apparatus comprises one or more filter assemblies and a manifold. Each filter assembly includes a screen defining a filter pocket, a filter insert in the filter pocket, a drain bracket attached to the filter screen, and a drain fitting. The filter assemblies are in fluid communication with a common pump by way of suction lines. Valves are provided in the suction lines to allow closing the fluid communication between each filter apparatus and the pump. An inlet line allows flow from the pump outlet to the fryer container.

Flow from each filter apparatus to the pump may be selectively interrupted to allow removal of an individual filter assembly while flow from one or more other filter apparatuses to the pump is maintained. Accordingly, the filtering system may be continuously operated while a filter assembly is removed and replace.

The filter apparatus includes a drain fitting attached to the filter screen and a manifold having an opening to allow slideable insertion and removal of the filter assembly.

In an exemplary embodiment a heat shield is provided intermediate a heating element disposed in the fryer and each filter apparatus.

Vertical, or substantially vertical, orientation of the filter screen with the drain fitting disposed at a lower edge of the filter screen and a handle disposed at an upper edge of the filter screen facilitates removal and insertion of the filter assembly.

BRIEF DESCRIPTION OF THE DRAWINGS

For a more complete understanding of the exemplary embodiments of the invention, reference is now made to the following Description of Embodiments of the Invention, taken in conjunction with the accompanying drawings, in which.

DESCRIPTION OF EMBODIMENTS OF THE INVENTION

The exemplary embodiments and their advantages are best understood by referring to the drawings, like numerals being used for like and corresponding parts of the various drawings. In FIGS. 1-5 various views an embodiment of liquid filtering system 10 are depicted. Liquid filtering system 10 includes container 12 for holding liquid cooking oil 14. In the illustrated embodiment, container 12 is a deep fat fryer tank with cooking oil 14 for frying foods therein.

A heating element 16 is installed within container 12 and below the surface of cooking oil 14 for heating cooking oil 14. In the illustrated embodiment, heating element 16 is an electric heating coil.

In the embodiment disclosed, two filter apparatuses 11 are installed within container 12, with one filter apparatus 11 on each side of heating element 16. In the embodiment shown each filter apparatus 11 includes two filter assemblies 18. Liquid filtering system 10 thus includes two filter apparatuses 11, each having two filter assemblies 18.

Each filter assembly 18 is vertically oriented in container 12 with a drain fitting 40 at a lower edge 20. Each filter assembly 18 has a length dimension substantially equivalent to the length dimension of the interior of container 12. The height of each filter assembly 18 is determined such that the upper edge of the filter assembly 18 is below the level of cooking oil 14 surface during frying operation of container 12. Each filter assembly 18 is constructed to drain from its lower edge 20 at a drain fitting 40.

Figure 9:
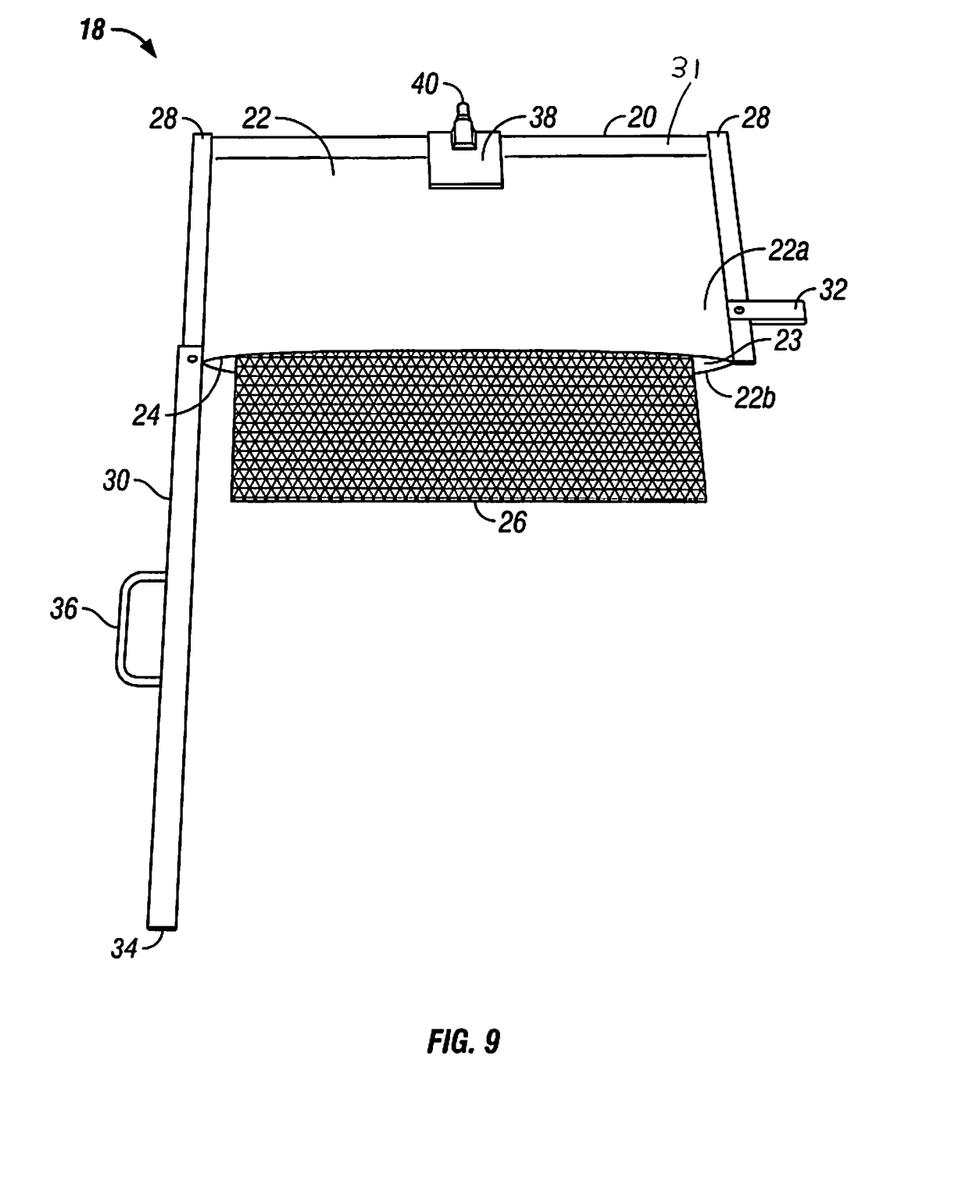
FIG. 9 is a side view of a filter assembly of an example embodiment, partially disassembled.

Referring to FIG. 9, filter assembly 18 includes at its perimeter side frame members 28 and upper frame member 30. Upper frame member 30 is rotatably attached at one end to one of the side frame members 28. Filter assembly 18 also includes a filter screen 22 having a pocket 23 therein opening at upper edge 24 of filter screen 22. Filter screen 22 is framed by side frame members 28 and upper frame member 30. Filter screen 22 is comprised of a filter screen material. In an exemplary embodiment, the filter screen material is a stainless steel wire mesh.

A filter insert 26 is inserted and contained within the pocket 23 of filter screen 22 when filter assembly 18 is assembled. After filter insert 26 has been fully inserted into pocket 23 of filter screen 22, upper frame member 30 is rotated down so as to close the opening of the pocket 23 of filter screen 22. Connector 32 is then rotated over the free end 34 of upper frame member 30 so as to retain it in the closed position. Filter insert 26 is sized and constructed to maintain separation of first side 22a of filter screen 22 from the opposed second side 22b of filter screen 22. Filter insert 26 is constructed to allow free flow of liquid within pocket 23. In an exemplary embodiment, filter insert 26 may be constructed of a slitted grid material, the slitted grid formed generally by providing parallel slits in a metallic plate and deforming the area between the slits to provide alternately raised and lowered sections in the plate. The slitted grid provides multiple passageways for fluid flow through pocket 23.

Figure 6:
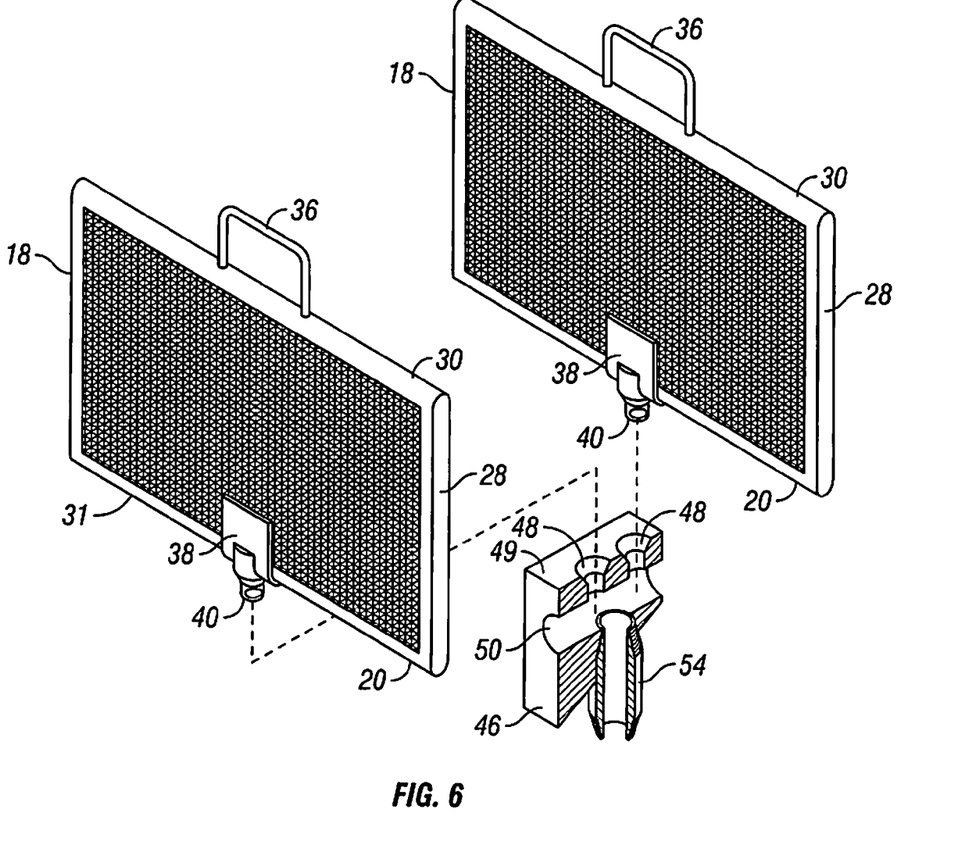
FIG. 6 is an exploded, perspective view of a pair of filter assemblies and a manifold block of an example embodiment.
Figure 7:
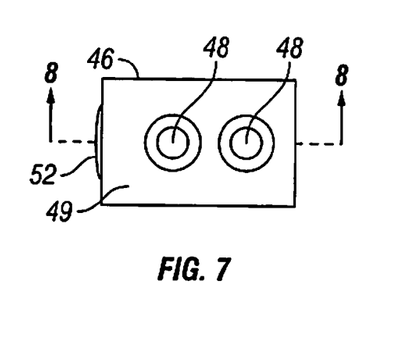
FIG. 7 is a top view of a manifold block of an example embodiment.
Figure 10:
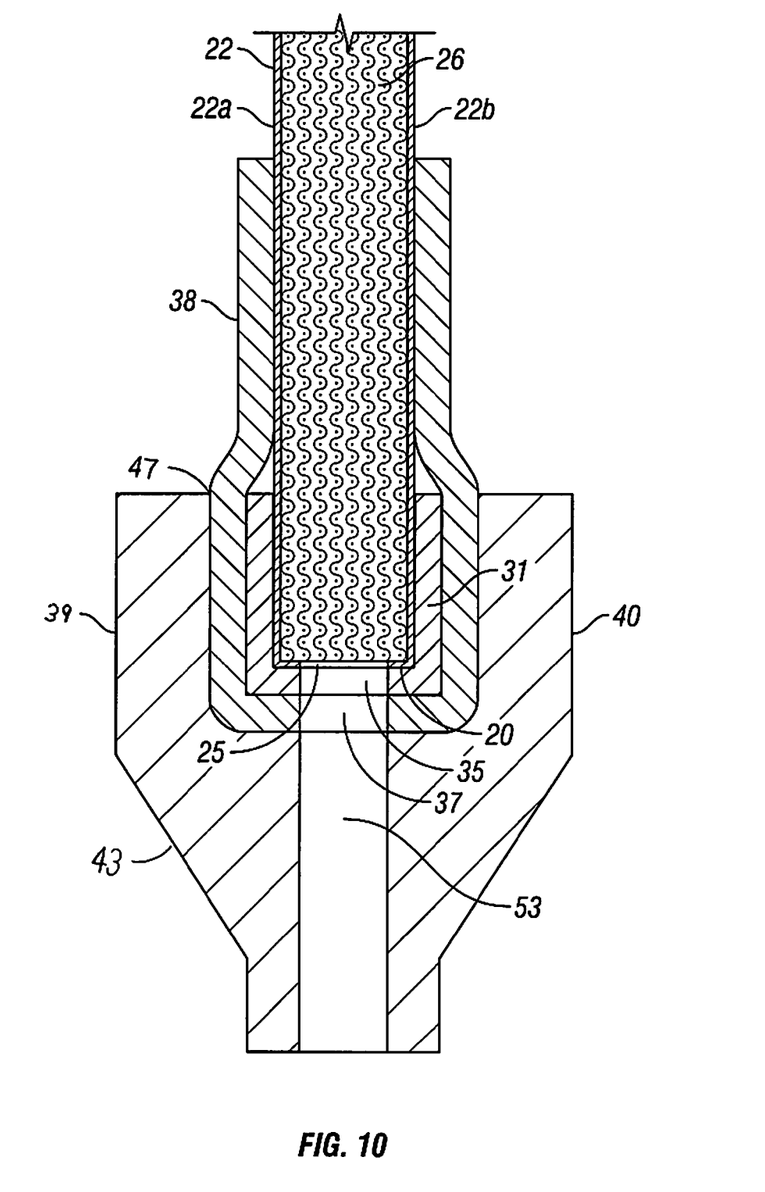
FIG. 10 is a cross section of a portion of the filter assembly of FIG. 9 taken along line 9-9, and a cross section of an outlet port.

Filter screen 22 may be formed of a single section of material folded to define lower edge 20. To provide additional strength, a lower frame 31 may be attached to filter screen 22 at lower edge 20. An exemplary lower frame 31 is depicted in FIGS. 6, 9 and 10. Alternatively, filter screen 22 may be formed of separate segments 22a and 22b with the separate segments 22a and 22b retained by side frame members 28, upper frame member 30 and lower frame member 31.

A drain bracket 38 is fastened to filter screen 22 at lower edge 20. A drain fitting 40 is attached to drain bracket 38. The drain fitting 40 extends from the filter screen's 22 lower edge 20 for draining filtered cooking oil 14 from filter assembly 18.

Referring to FIG. 10, a detailed cross section of drain bracket 38 and drain fitting 40 attached to filter screen 22 is shown. Filter insert 26 is shown inside filter screen 22. Filter assembly 18 has a lower frame member 31. Lower frame member 31 is positioned around the bottom edge of filter screen 22. Drain bracket 38 is attached around lower frame member 31 and extends above lower frame member 31. Where drain bracket 38 extends above lower frame member 31, drain bracket 38 is abutting filter screen 22 to provide more secure attachment to filter screen 22.

In the event filter screen 22 is folded at lower edge 20 without attachment of a lower frame 31, drain bracket 38 is attached directly to filter screen 22. Drain fitting 40 comprises an upper section 39 and a tapered lower insert segment 43. A bore 53 extends through upper section 39 and tapered lower insert segment 43. A notch 47 is formed in upper section 39. Notch 47 and drain bracket 38 are sized and constructed such that drain bracket 38 is received in notch 47. Drain fitting 40 is attached to drain bracket 38 at notch 47.

An opening 25 is provided in lower edge 20 of filter screen 22. An opening 35 is provided in lower frame member 31. An opening 37 is provided in drain bracket 38. Opening 25, opening 35, opening 37 and bore 53 are aligned to allow flow of liquid from pocket 23 through opening 25, opening 35, opening 37, and bore 53.

Figure 1:
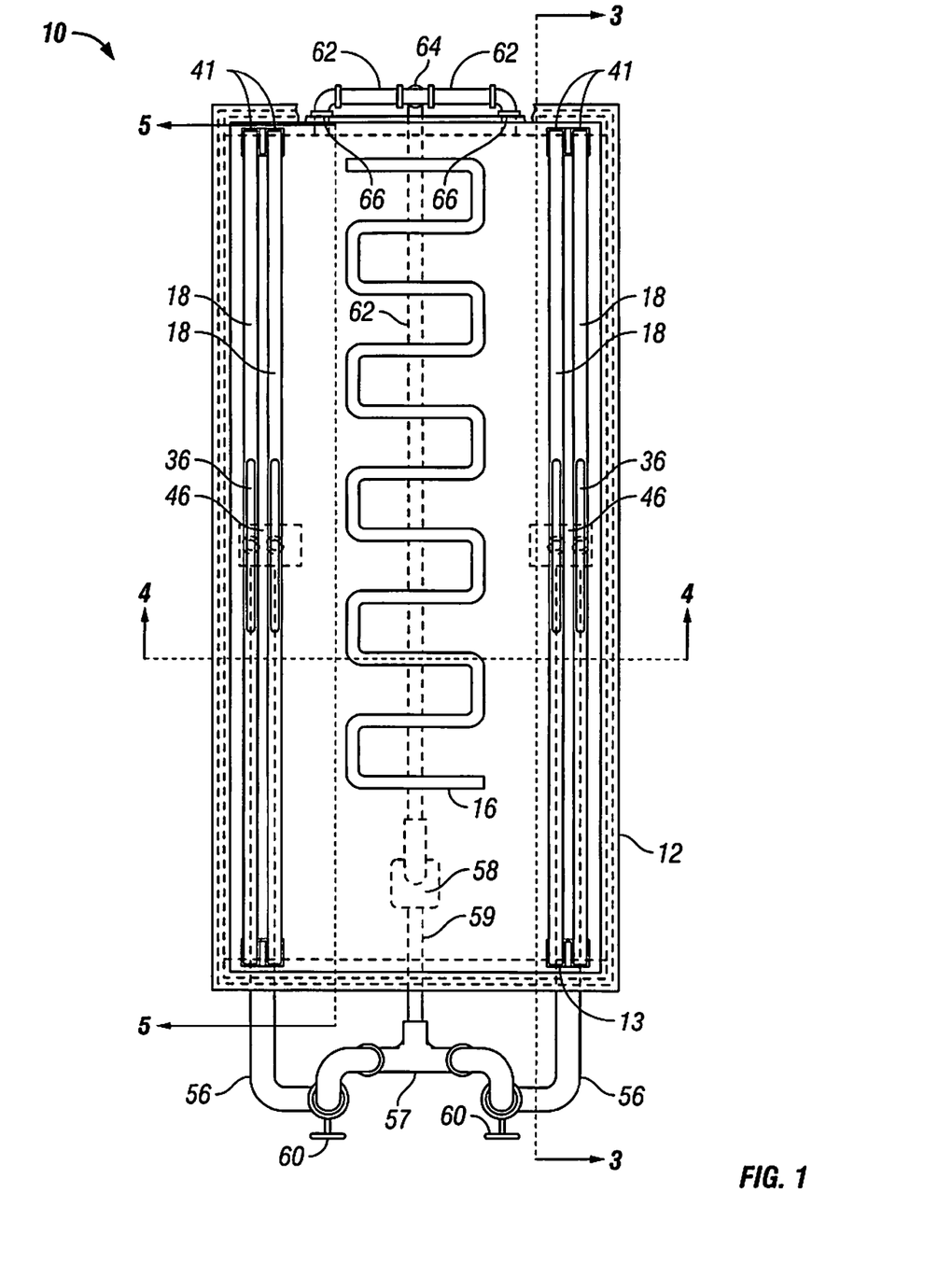
FIG. 1 is a top elevation view of an example embodiment.
Figure 4:
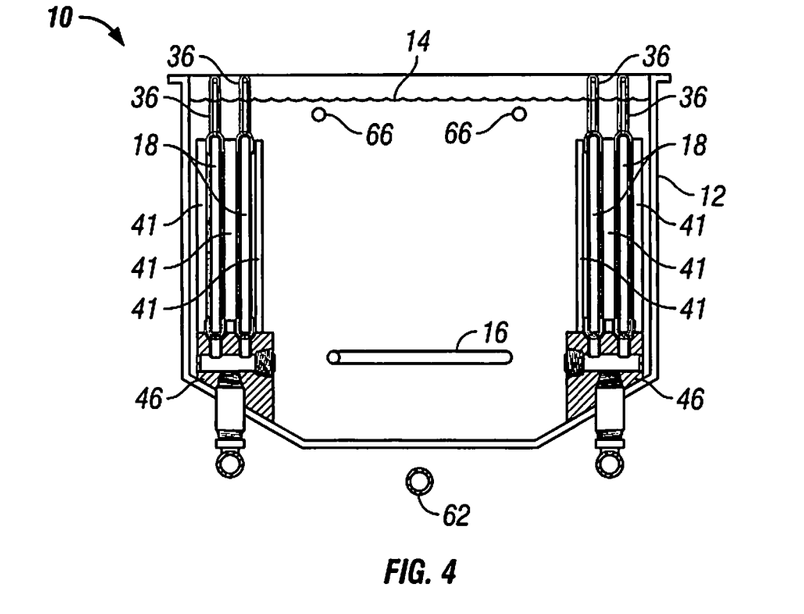
FIG. 4 is a cross-sectional view of an example embodiment, taken along line 4-4 in FIG. 1, with the manifold blocks shown in cross-section.
Figure 5:
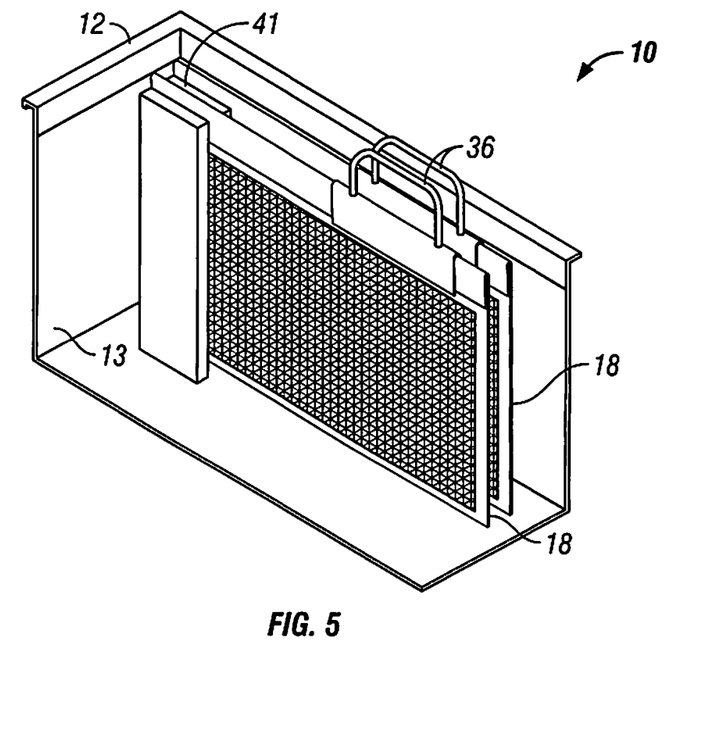
FIG. 5 is a partial, perspective view of an example embodiment, taken along line 5-5 in FIG. 1.

Referring to FIGS. 1, 4, and 5, each side frame member 28 of each filter assembly 18 slides into a corresponding channel 41 attached to an interior end wall 13 of container 12. Channels 41 are provided in opposing walls 13 of container 12. Accordingly filter assemblies 18 are held in vertical positions in container 12. Depending on the orientation required, channels 41 may be arranged other than vertically to allow orientation of filter assemblies 18 at other than vertical orientations. The sliding connection of each side frame member 28 with each corresponding channel 41 is loose enough to allow ready insertion and removal of filter assembly 18 in container 12 using handle 36.

Handle 36 is attached to upper frame member 30 near its center. Handle 36 facilitates removal of filter assembly 18 from container 12, and its replacement therein.

Referring to FIGS. 1, 4, 6, 7 and 8, manifold blocks 46 are installed at the bottom of container 12 to receive drain fittings 40 of filter assemblies 18. Upper surface 49 of each manifold block 46 is provided with two countersunk receiver openings 48 for receiving each of the drain fittings 40 attached to drain brackets 38 on filter assemblies 18 when filter assemblies 18 are installed in container 12.

Drain fitting 40 includes a tapered lower insert segment 43. Insert segment 43 is sized to fit in receiver opening 48. Countersunk receiver opening 48 is provided with inclined wall 51. Tapered insert segment 43 and inclined wall 51 are sized and constructed to allow sliding insertion of segment 43 in receiver opening 48 and sliding removal of segment 43 from receiver 48. Upon insertion of segment 43 into receiver opening 48 a close fit is obtained between at least a portion of segment 43 and a portion of receiver 48.

Figure 8:
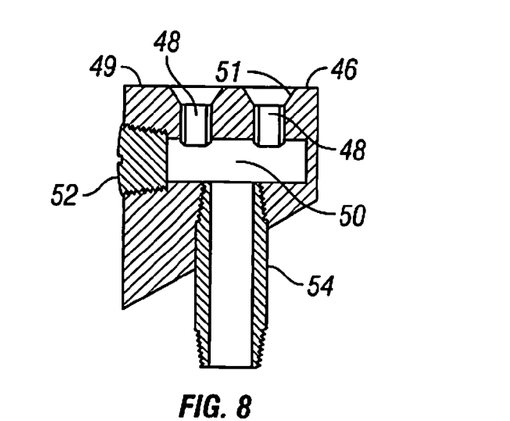
FIG. 8 is a cross-sectional elevation view of the manifold block, taken along line 8-8 in FIG. 7.

As best seen in FIGS. 6 and 8, a lateral bore 50 is provided in each manifold block 46. Receiver openings 48 connect to lateral bore 50, providing an opening for fluid flow from each pair of filter assemblies 18 through lateral bore 50. As best seen in FIG. 8, plug 52 closes an open end of lateral bore 50, preventing fluid flow therethrough. Threaded nipple 54 installed in manifold block 46 connects bore 50 with a suction tube 56, described herein.

Figure 2:
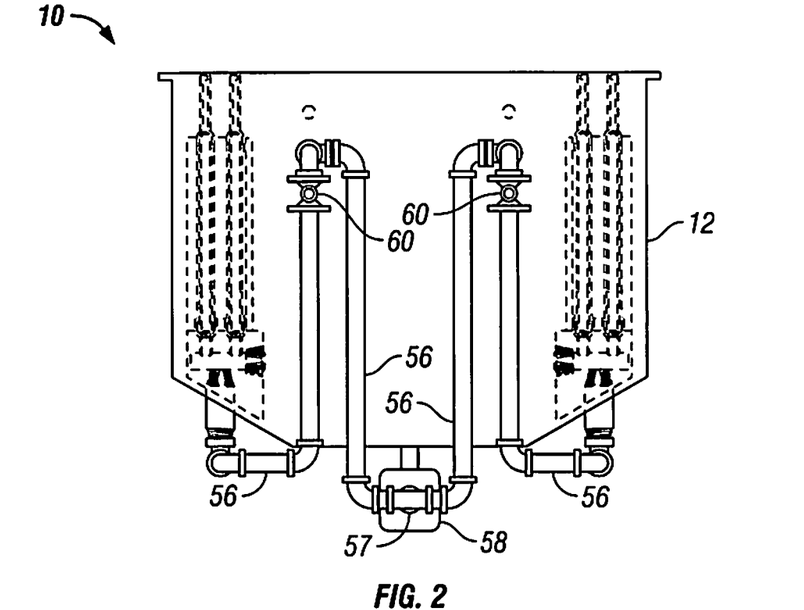
FIG. 2 is a front elevation view of an example embodiment of FIG. 1.
Figure 3:
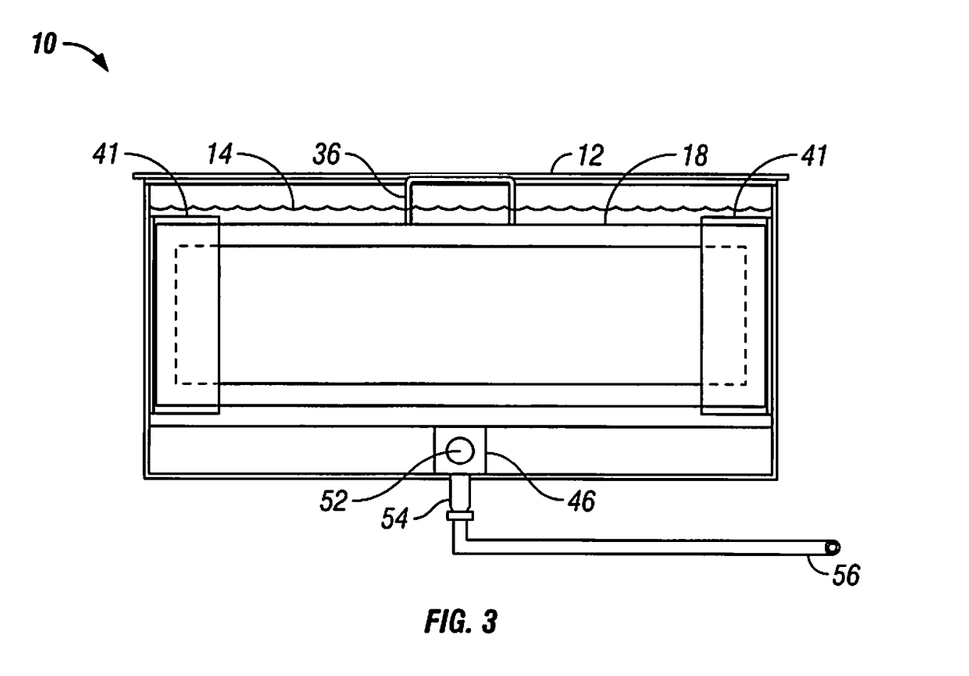
FIG. 3 is a cross-sectional view of an example embodiment, taken along line 3-3 in FIG. 1.

Referring to FIGS. 1, 2, and 3, pump 58 is provided. In the exemplary embodiment, pump 58 is operated by an electric motor (not illustrated) from a manual or remote switch (not illustrated). Suction tube 56 is connected to pump 58 and provides fluid communication between manifold blocks 46 and pump 58. The inlet ends of suction tubes 56 are thus in fluid communication with filter assemblies 18, and the outlet ends of suction tubes 56 are in fluid communication with pump 58. In the exemplary embodiment, suction tubes 56 from the pairs of filter assemblies 18 on the opposite sides of container 12 join at T-fitting 57, which leads to pump 58 through a common suction tube 59.

As seen in FIGS. 1 and 2, a shut-off valve 60 is installed in each suction tube 56 that is connect to a manifold block 46. Each shut-off valve 60 permits a user to shut off fluid flow in the corresponding suction tube 56. Accordingly, a selected pair of filter apparatus 11 may be shut off from pump 58, and thus taken out of operation, while the other filter apparatus 11 remains in use for filtering cooking oil 14. Thus, filtering of the cooking oil 14 may continue during frying operations of the container 12 by use of the filter assemblies 18 in fluid communication with pump 58 while the disconnected and non-operating filter assemblies 18 are removed from container 12 for cleaning, servicing, or replacement.

As seen in FIGS. 1 and 3, the filtered cooking oil 14 is returned to container 12 for continued use in a frying operation through discharge tube 62. The inlet end of discharge tube 62 is connected to the discharge port of pump 58. In the exemplary embodiment shown, discharge tube 62 connects to a discharge T-fitting 64, from which a pair of discharge tubes 62 lead to inlet ports 66 installed in the wall 13 of container 12. Inlet ports 66 are located below the surface of the cooking oil 14 to prevent splashing of hot cooking oil 14 returning into container 12. In various embodiments, suction tube 56 and discharge tube 62 are made from aluminum, stainless steel, or other suitable material.

Figure 11:
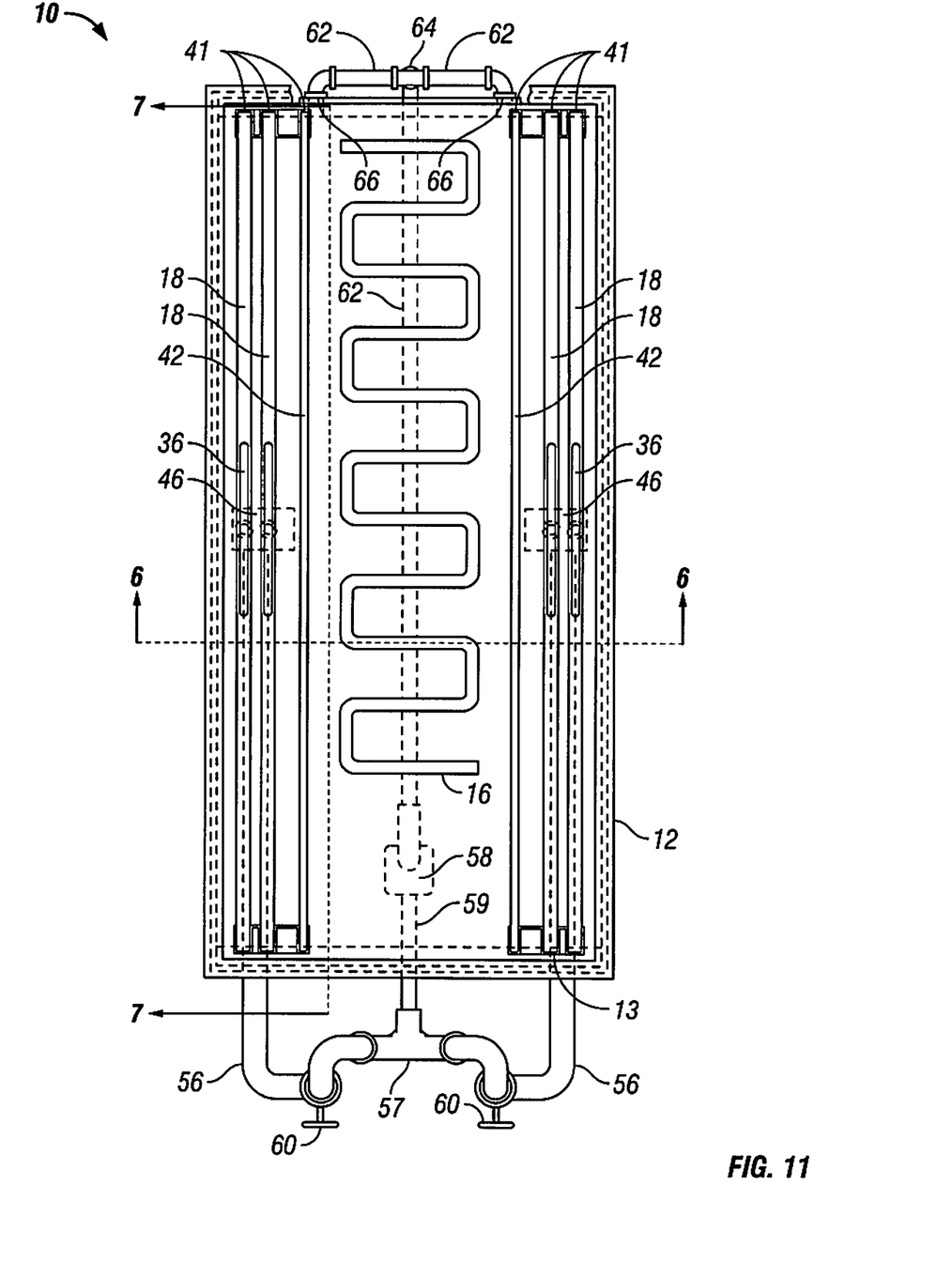
FIG. 11 is a top elevation view of an alternate exemplary embodiment.
Figure 12:
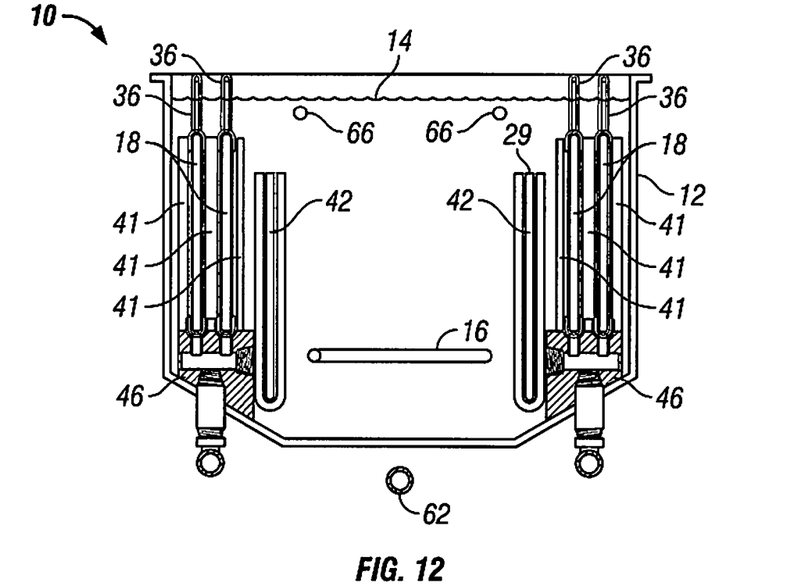
FIG. 12 is a cross-sectional view of an alternate exemplary embodiment, taken along line 4-4 in FIG. 11, with the manifold blocks shown in cross-section.
Figure 13:
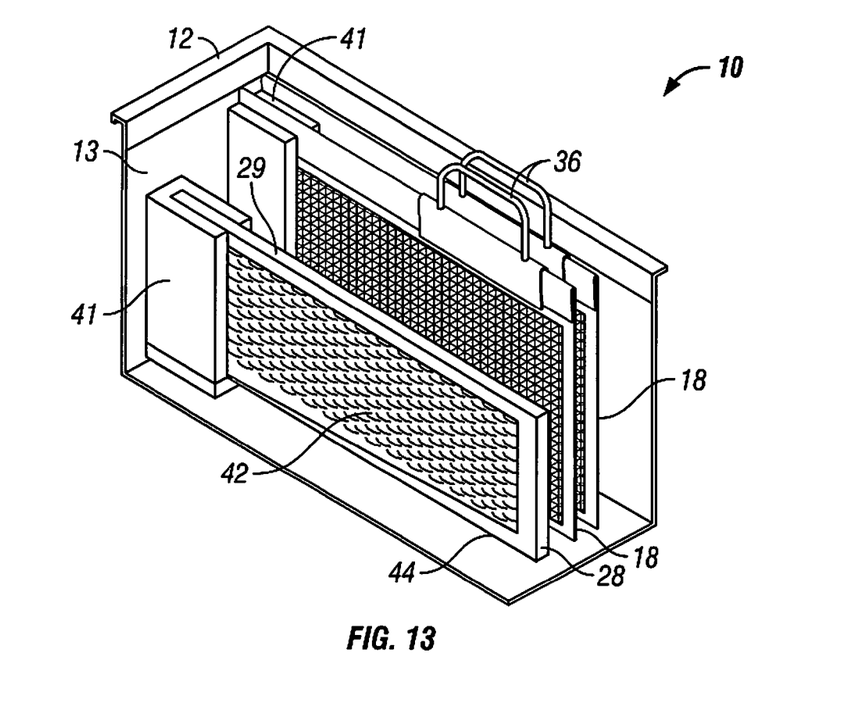
FIG. 13 is a partial, perspective view of an alternate exemplary example embodiment, taken along line 5-5 in FIG. 11.

In an alternate exemplary embodiment shown in FIGS. 11, 12 and 13, a pair of heat shields 42 are installed in container 12. Each heat shield 42 is positioned intermediate a filter assembly 18 and heating element 16.

A primary purpose of heat shields 42 is to reduce charring of comestible matter (not shown) collected on each filter assembly 18. During operation filter assemblies 18 each collect particulate matter, including flour and other comestible bits on the surface of filter screens 22. During operation, the temperature of the cooking oil 14 is hottest proximate heating element 16. Heat shields 42 prevent direct flow of cooking oil 14 from heating element 16 to filter assemblies 18, thus preventing the matter retained on filter screens from the higher-temperature cooking oil 14 immediately adjacent heating element 16.

Heat shields 42 may further be constructed to orient flow within container 12 in a desired pattern.

In the exemplary embodiment, each heat shield 42 has a length dimension extending substantially the length dimension of filter assemblies 18. As best seen in FIG. 13, each heat shield 42 is generally rectangular and planar in shape. A metallic plate of stainless steel or aluminum has been proven to be suitable for use as a heat shield at temperatures incurred in cooking oil 14 applications.

In the exemplary embodiment shown, each heat shield 42 is constructed such that the upper edge 29 of the heat shield 42 is below nominal surface level of cooking oil 14 within container 12. Each heat shield 42 is constructed to allow fluid flow intermediate a lower edge of the heat shield 42 and the bottom of container 12.

In an alternative embodiment (not illustrated), heat shields 42 may extend vertically only a short distance above the height of heating element 16 and a short distance below the height of the bottom of heating element 16. In this embodiment, heat shields 42 still protect filter assemblies 18 from direct flow of cooking oil 14 from heating element 16, while allowing free indirect flow between heating element 16 and filter assemblies 18.

In the illustrated embodiment, heat shield 42 includes peripheral frame 44. Referring to FIGS. 11, 12 and 13, the lateral edges of heat shields 42 slide into extruded channels 41 attached to the interior end walls 13 of container 12 for retaining heat shields 42 in their upright positions in container 12. Heat shield 42 may include handle 45 (not shown) on its upper edge near its center for facilitating the removal of heat shield 42 from container 12, and its replacement therein.

In operation, when contaminated cooking oil 14 in fryer tank 12 is to be cleaned, pump 58 is started.

Pump 58 creates a negative pressure in suction tubes 56 and manifold blocks 46. The negative pressure helps to secure drain fittings 40 in receiver openings 48 in manifold blocks 46. A seal is created between drain fittings 40 and the walls 51 of countersunk receiver openings 48.

Pump 58 draws cooking oil 14 through filter assemblies 18, openings 25, openings 35, openings 37 and into bores 53. Contaminants in the cooking oil 14 are blocked by filter screens 22 of filter assemblies 18. Generally, such contaminates accumulate on the exterior surfaces of filter screens 22.

From bores 53 the cooking oil 14 is drawn into bores 50 in manifold blocks 46. The cooking oil 14 is then drawn from lateral bores 50 in manifold blocks 46 through nipples 54 to suction tubes 56. Pump 58 draws the filtered cooking oil 14 through suction tubes 56 and passes it into discharge tube 62. The cooking oil 14 is redeposited into fryer tank 12 through inlet ports 66 at the terminal ends of discharge tubes 62.

Liquid filtering system 10 may be operated in a continuous manner for filtering the cooking oil 14 while the oil is kept at cooking temperature, and while food is being cooked in container 12. When a layer of contaminants has built up on the outer surface of filter assemblies 18, a corresponding shut-off valve 60 may be closed stopping flow from the corresponding filter apparatus 11 and removing the associated pair of filter assemblies 18 from operation. The negative pressure in the associated manifold block 46 is abated. Each associated filter assembly 18 may be then lifted by its handle 36. Each associated drain fitting 40 slides out of its associated receiver opening 48. The subject filter assembly 18 is removed from container 12 for cleaning or replacement. The other filter apparatus 11 with its pair of filter assemblies 18 may remain in operation while the removed filter assemblies 18 are disengaged.

The disengaged filter assemblies 18 may be replaced in fryer tank 12. Their associated drain fittings 40 are slid into the associated receiver openings 48 in the associated manifold block 46. Their associated valve 60 is reopened, restoring the negative pressure in the associated manifold block 46 and securing the associated drain fittings 40. Additionally, the negative pressure establishes a seal between the associated tapered lower insert segment 43 and inclined wall 51 of the associated receiver opening 48. Cooking oil 14 is drawn through the installed filter assemblies 18.

The above procedure may then be repeated to remove and clean or replace the other pair of filter assemblies 18. By alternating removal and cleaning of pairs of filter assemblies 18 in this manner, the cooking apparatus may be used continuously if desired, without the necessity of a complete shut-down for filter cleaning purposes.

The exemplary embodiment describes use of two filter apparatuses 11 and four filter assemblies 18. An additional filter assembly 18 may be used by providing, for example, an additional receiver opening 48 in a manifold.46. One less filter assembly 18 may be used by, for example, removing a filter assembly 18 and blocking a corresponding receiver opening 48. More or less filtering capacity may be provided by varying the number and size of filtering assemblies 18. Variation of filtering capacity may be obtained without replacement of pump 58.

The liquid filter mounting apparatus of the present invention, and many of its intended advantages, will be understood from the foregoing description of example embodiments. Embodiments of the invention and their advantages have been described in detail using many specific parameters in order to disclose how to make and use the invention. Various changes, substitutions, and alterations may be made in the manner, procedure, and details of the embodiments described without departing from the spirit and scope of the invention or sacrificing any of its material advantages. Examples of such changes, substitutions, and alterations are given below but many other changes, substitutions, and alterations are also possible.

Various types of heating elements 16 can be used including, but not limited to, electric heating coils and gas heated tubes. An embodiment may have no heating element 16.

Filter assemblies 18 may be of various length or height. Filter assembly 18 can have a length shorter or longer than container 12. Filter screen 22 may consist of only a single filter surface. Filter screen 22 may have no peripheral frame.

Drain fitting 40 can have various types of internal bores or passageways providing fluid connectivity between filter element 18 and manifold block 46. Drain fitting 40 and drain bracket 38 may be constructed as an integral unit.

Drain bracket 38 may be attached to filter assembly 18 by welding, soldering or other manner.

Manifold block 46 may be constructed as a unitary outlet port passing through the wall of container 12 and sized to recieveably fit drain fitting 40. Manifold block 46 may be provided with a desired number of receiver openings 48.

Various embodiments of the invention will be understood from the foregoing description, and it will be apparent that, although embodiments of the invention have been described in detail, various changes, substitutions, and alterations may be made in the manner, procedure and/or details thereof without departing from the spirit and scope of the invention, as defined by the appended claims, or sacrificing any of its material advantages, the forms hereinbefore described being merely exemplary embodiments thereof.

I claim:

1. A filter apparatus for a fryer, said fryer having a fryer container for containing cooking oil with at least one heating element disposed within said fryer container, said filter apparatus comprising:
   at least one filter assembly disposed within said fryer container;
   each said at least one filter assembly having a drain fitting extending therefrom;
   at least one manifold disposed within said fryer container;
   said at least one manifold each having at least one receiver opening in a manifold upper surface;
   said at least one manifold each having a manifold bore therein, wherein said manifold bore is in fluid communication with said receiver opening
   each said drain fitting having a fitting opening;
   said fitting opening, said receiver opening, and said manifold bore structured to cooperatively provide fluid communication from said at least one filter assembly through said manifold bore;
   each said at least one filter assembly selectively connectable to its respective said at least one manifold by functional coupling of each said drain fitting to the corresponding said receiver opening;
   said at least one filter assembly comprises at least four filter assemblies;
   said plurality of manifolds comprises at least two manifolds, wherein each said manifold has a plurality of said receiver openings; and,
   said heating element is disposed intermediate at least two said first filter assemblies and at least two said second filter assemblies.

2. The filter apparatus of claim 1, further comprising:
   said at least one filter assembly having opposed side edges; and
   each said side edge receivable in a container wall channel.

3. The filter apparatus of claim 1, further comprising:
   said drain fitting having a tapered lower end;
   said receiver opening having a tapered wall; and
   said fitting lower end receivable in said tapered wall.

4. The filter apparatus of claim 1, further comprising:
   each said filter assembly having at least one filter screen having a filter pocket therein;
   at least one filter insert insertable into said filter pocket; and
   said at least one manifold having at least two receiver openings in said manifold upper surface.

5. The filter apparatus of claim 1, further comprising:
   each said at least one filter assembly having opposed side frames; and
   each said side frame receivable in a container wall channel.

6. The filter apparatus of claim 1, wherein:
   each said at least one filter assembly has a lower frame member; and
   said drain fitting attached to said lower frame member.

7. The filter apparatus of claim 1, wherein:
each said at least one filter assembly having a drain bracket attached to said filter screen;
said drain fitting attached to said drain bracket; and
an opening in said drain bracket allowing fluid communication from said pocket through said drain fitting.

8. The filter apparatus of claim 4, wherein said at least one filter screen is formed of a single section of material that is folded to define said filter pocket; and wherein said filter insert is constructed to allow flow of liquid within said filter pocket.

9. A continuous filtering fryer system comprising:
a fryer container having a heating element therein;
at least two filter apparatuses disposed in said container;
each said at least two filter apparatuses comprising at least one filter assembly;
each said at least one filter assembly comprising a screen, a filter pocket and a drain fitting in fluid communication with said filter pocket;
at least one heat shield disposed within said fryer container intermediate at least one of said at least two filter apparatus and said heating element;
said heat shield extending substantially the length of said at least one filter assembly;
a pump;
said drain fitting in fluid communication with a pump;
an inlet in said container;
said pump in fluid communication with said inlet;
a valve intermediate each said filter apparatus and said pump;
each said valve selectively operable to control flow therethrough;
said at least one filter assembly comprises at least four filter assemblies;
at least two manifolds, wherein each said manifold has a plurality of said receiver openings; and,
said heating element is disposed intermediate at least two said first filter assemblies and at least two said second filter assemblies.

10. The continuous filtering fryer system of claim 9, wherein:
a said at least two manifolds having at least one receiver opening in each respective manifold's upper surface; and
each said drain fitting slideably receivable in a corresponding receiver opening.

11. The continuous filtering fryer system of claim 9, wherein:
each said filter apparatus further comprising a filter insert received in said pocket; and
each said manifold having a manifold bore; and
said manifold bore in fluid communication with said receiver opening.

12. The continuous filtering fryer system of claim 9, wherein:
each said filter apparatus further comprising a drain bracket at least partially intermediate said receiver fitting and said screen.

13. The continuous filtering fryer system of claim 9, wherein:
said at least one heat shield comprises a first heat shield and a second heat shield;
said first heat shield disposed intermediate said heating element and said first filter assembly; and
said second heat shield disposed intermediate said heating element and said second filter assembly.

14. The continuous filtering fryer system of claim 9, wherein:
each said heat shield comprising a planar member;
said container having a plurality of container walls;
said container walls having a plurality of wall channels; and
each said heat shield receivable in at least one of said wall channels.

15. The continuous filtering fryer system of claim 9, wherein:
each said heat shield comprising a planar member;
each said heat shield sized and constructed to prevent direct fluid flow from said heating element to each said at least one filter apparatuses; and
each said heat shield sized and constructed to allow fluid flow indirectly from said heating element to each said at least one filter apparatus.

* * * * *